(12) United States Patent
Chilikin

(10) Patent No.: US 9,952,993 B2
(45) Date of Patent: Apr. 24, 2018

(54) SINGLE-WIRE COMMUNICATION WITH ADAPTIVE START-BIT CONDITION

(71) Applicant: Intel Corporation, Santa Clara, CA (US)

(72) Inventor: Andrey Chilikin, Limerick (IE)

(73) Assignee: Intel Corporation, Santa Clara, CA (US)

(*) Notice: Subject to any disclaimer, the term of this patent is extended or adjusted under 35 U.S.C. 154(b) by 440 days.

(21) Appl. No.: 14/499,059

(22) Filed: Sep. 26, 2014

(65) Prior Publication Data
US 2016/0092385 A1  Mar. 31, 2016

(51) Int. Cl.
*G06F 13/36* (2006.01)
*G06F 13/362* (2006.01)
*G06F 13/364* (2006.01)

(52) U.S. Cl.
CPC ........ *G06F 13/3625* (2013.01); *G06F 13/364* (2013.01); *Y02B 60/1228* (2013.01)

(58) Field of Classification Search
None
See application file for complete search history.

(56) References Cited

U.S. PATENT DOCUMENTS

2010/0054313 A1* 3/2010 Chu ............... G06F 13/4291
375/220
2016/0011574 A1* 1/2016 Kolof ............. G06F 13/4068
700/11

\* cited by examiner

*Primary Examiner* — Idriss N Alrobaye
*Assistant Examiner* — Richard B Franklin
(74) *Attorney, Agent, or Firm* — Schwabe, Williamson & Wyatt, P.C.

(57) ABSTRACT

The present disclosure pertains to a wired network which includes a master device and a plurality of slave devices coupled to the master device by a wired connection. The master device includes control logic to determine whether information is to be sent to a slave device. In addition, the master device includes a transmitter to drive a logic level for a predetermined amount of time to address the slave device in response to the control logic to determine whether information is to be sent to a slave device.

21 Claims, 6 Drawing Sheets

SINGLE-WIRE COMMUNICATION WITH ADAPTIVE START-BIT CONDITION

FIELD

This disclosure pertains to networking systems and in particular (but not exclusively) to communication methods between master and slave devices within a wired network.

DETAILED DESCRIPTION

Figure 1:
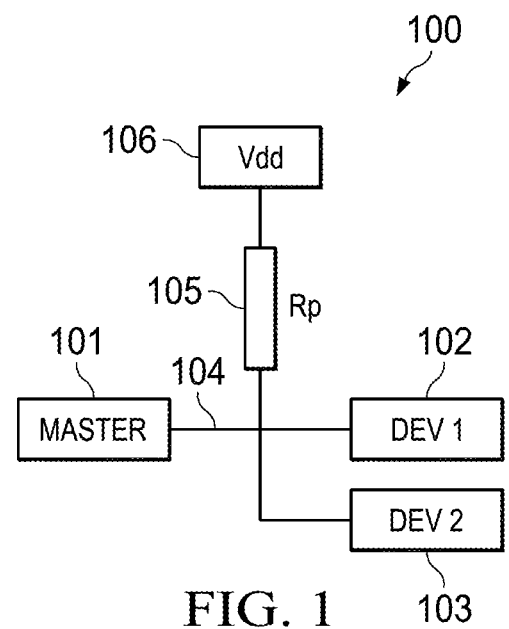
FIG. 1 is a diagram illustrating a multi-drop configuration system consistent with an embodiment of the present disclosure.

The following description sets forth numerous specific details such as examples of specific types of processors and system configurations, specific hardware structures, specific architectural and micro-architectural details, specific register configurations, specific instruction types, specific system components, specific measurements/heights, specific processor pipeline stages and operation, etcetera, in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic, and other specific operational details of computer system have not been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™ and may be also used in other devices, such as handheld devices, tablets, other thin notebooks, system-on-a-chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatuses, methods, and systems described herein are not limited to physical computing devices but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide the highest possible performance with maximum power saving.

Note that the apparatus, methods, and systems described above may be implemented in any electronic device or system as aforementioned. As specific illustrations, the figures below provide exemplary systems for utilizing the invention as described herein.

The present disclosure pertains to a wired network which includes a master device and a plurality of slave devices coupled to the master device by a wired connection. The master device includes control logic to determine whether information is to be sent to a slave device. In addition, the master device includes a transmitter to drive a logic level for a predetermined amount of time to address the slave device in response to the control logic to determine whether information is to be sent to a slave device.

FIG. 1 is a diagram illustrating a multi-drop configuration system 100 ("system 100") consistent with an embodiment of the present disclosure. As shown, system 100 includes a master device 101 coupled to a plurality of slave devices 102, 103 by a wired connection 104. In the figure, only two slave devices 102, 103 are shown. In some embodiments, a master/slave system includes a model of communication where one device or process has unidirectional control over one or more other devices.

In some implementations, the master device 101 may be selected from a group of devices on the wired connection 104. Slave devices 102, 103 may include a sensor or a plurality of sensors to measure unique properties. For example, slave devices 102, 103 may include a temperature, pressure, and/or humidity sensor. The master/slave system may be implemented within an Internet of Things environment.

However, a system 100 consistent with the present disclosure may include more or fewer slave devices than shown in the figure. In addition, a voltage source 105 and a resistive element 106 are electrically coupled to each slave device 102, 103. Both master and slave devices include a timing component (not shown) such as a counter to determine the length of time that the voltage level on the wired connection 104 deviates from a default logic level provided by the voltage source 105.

Notably, master device 101 and slave devices 102, 103 may communicate with each other along wired connection 104. In some implementations, each device within system 100 includes control logic to determine whether information is to be sent to a receiver device. Voltage source 105 may provide any suitable voltage level on the wired connection 104. For example, voltage source 105 may provide a voltage of 5V on the wired connection 104. Resistive element 106 may have a suitable value to change the logic level on the wired connection for a start-bit time interval. For example, resistive element 106 may have a resistance in the range of 1 k-10 k ohms. Wired connection 104 may have various attributes such as, but not limited to, full-duplexed, switched, and open-drained. Wired connection 104 may have sufficient bandwidth on the order of Kb or Gb.

To address a particular slave device within the system 100, master device 101 may change the logic level on the wired connection 104 for a start-bit time interval (i.e., pre-determined time period) as a technique to request data from a particular slave device on the wired connection 104. In some embodiments of the present disclosure, "addressing" a slave device is the manner in which a master device requests data from a slave device on the wired network.

The master device 101 and the slave devices 102, 103 may manipulate the logic level on the lower side of resistive element 106. In some implementations, when there is no communication, resistive element 106 brings the wire to the high logic level. To start communication, master device 101 may open a key (e.g., send a "0" data bit to general purpose input/output (GPIO) pins) and connect the resistive element 106 to the ground which changes the logic level to low. When the slave devices 102, 103 detect a logic level change, the devices 102, 103 will activate a start address recognition procedure. In some implementations, the start address recognition procedure includes calculating the length of time that the logic level stays low and then comparing this time with the slave device's address. Based on the comparison, if the slave device determines that it has been addressed, the device will reply by sending the master device 101 data (e.g., "1's" and "0's") once the wired connection 104 returns back to a high logic level.

It should be understood by those having ordinary skill in the art that a logic level is one of a finite number of signal states. Logic levels may represent the voltage difference between the signal and ground (or some other common reference point). In binary logic, the two levels are logical high and logical low, which generally correspond to a binary 1 and 0 respectively. Signals with one of these two levels can be used in boolean logic for digital circuit design or analysis.

Likewise, the slave devices 102, 103 may change the logic level on the wired connection 104 (e.g., for the start-bit time interval) to send an acknowledgment message to confirm to the master device 101 that the slave device was addressed. The master and slave devices may utilize a pull-up or pull-down resistor 105 to change the logic level on the wired connection 104.

Most importantly, only a single wired connection 104 propagating data is needed between the master device 101 and each slave device 102, 103 to achieve communication between the master device 101 and each slave device 102, 103. Accordingly, systems consistent with the present disclosure do not require a dedicated wired connection 104 (e.g., wire) between the master device 101 and each slave device 102, 103 to propagate a clock signal. As such, the system 100 shown in the figure includes a single wired connection 104 between the master device 101 and each slave device 102, 103 which obviates the need for an internal clock for data-line sampling.

Figure 2:
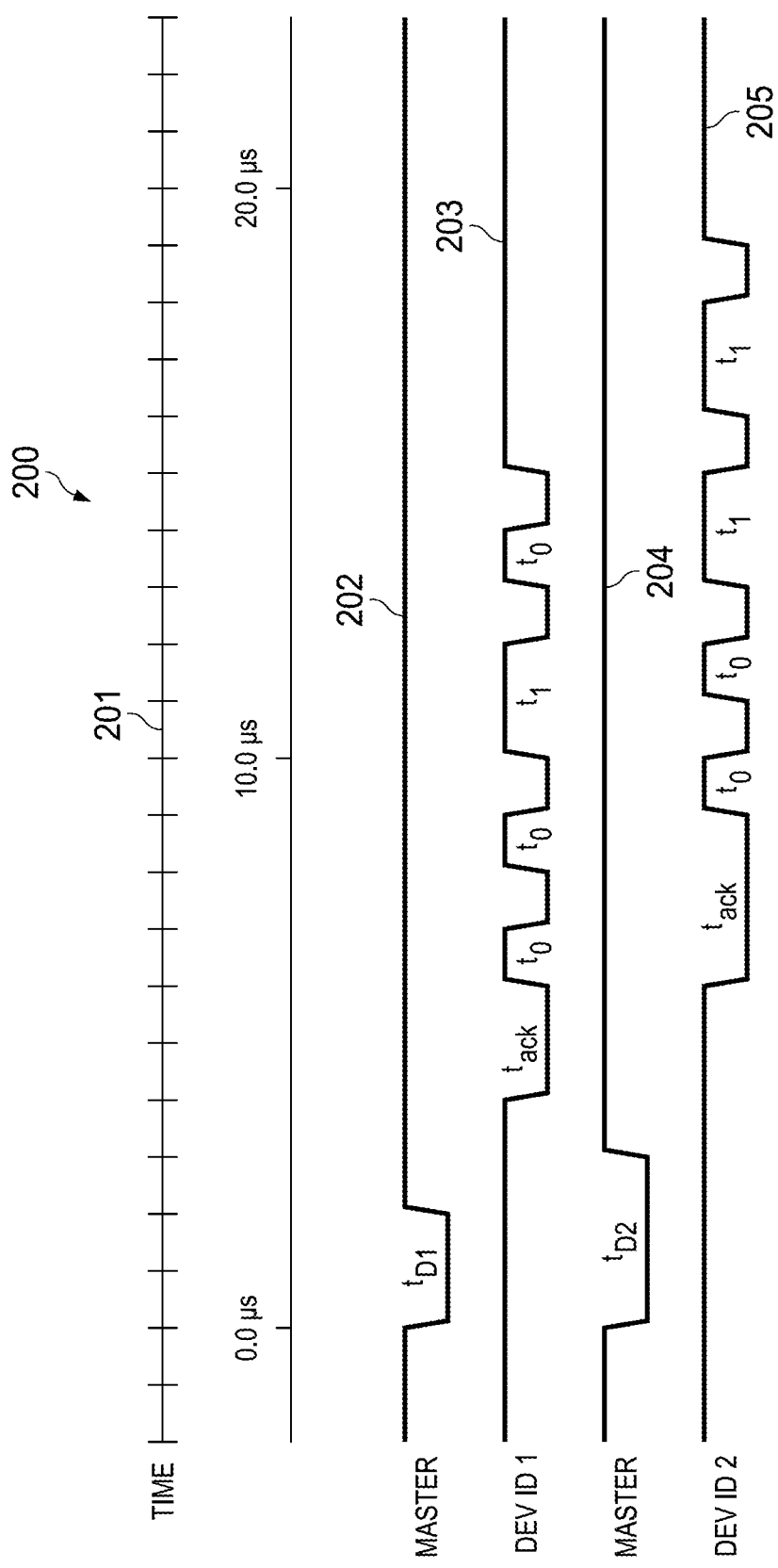
FIG. 2 is a timing diagram illustrating exemplary communication between a master device and a plurality of slave devices within a multi-drop configuration system.

FIG. 2 is a timing diagram 200 illustrating exemplary communication between a master device and a plurality of slave devices within a multi-drop configuration system (e.g., see FIG. 1). Timing diagram 200 shows examples of communications between a master device and two slave devices (Dev ID 1, Dev ID 2) within the multi-drop configuration system. Particularly, the time duration for which the logic level is changed (e.g., reduced) on the wired connection from a default logic level (i.e., voltage level) to a lower voltage level on a wired connection determines which slave device is addressed by the master device.

For example, at time 0.0 microseconds on time axis 201, the master device pulls down the voltage level of the wired connection (see voltage axis 202) to be reduced for approximately two microseconds to request data from slave device Dev ID 1. The slave devices may be configured with detection logic to sense the voltage level on the wired connection.

For example, the detection logic may be able to sense when the voltage level on the wired connection is at a first voltage level (e.g., $V_{dd}$) and when the voltage level on the wired connection is reduced. In alternative implementations, the wired connection may be normally set to 0V, and therefore the detection logic within each slave device may be able to detect when the voltage on the wired connection is increased.

Each slave and master device may include control logic (not shown) to determine whether information is to be sent to another device. In addition, each device may include a transmitter (not shown) to drive a logic level for a first pre-determined time period to address the first receiver device in response to the control logic to determine whether information is to be sent to another device.

For example, the control logic of a slave device may be configured to send data (and an acknowledgment message in some embodiments) upon receiving the data-request signal from the master device. For example, the master device may address slave devices Dev ID 1 and Dev ID 2 by driving the logic level to change from the default logic level for four and five microseconds, respectively.

Returning back to FIG. 2, after the default logic level on the wired connection is reduced for time $t_{d1}$ to address slave device Dev ID 1, slave device Dev ID 1 may send an acknowledgement message to the master device confirming that the slave device has detected that it has been addressed. In one or more implementations, slave device Dev ID 1 sends an acknowledgement message confirming that it has been addressed by the master device by driving the logic level on the wired connection to be reduced, in like fashion, for a time $t_{ack}$. In some embodiments, times $t_{d1}$ and $t_{ack}$ are equal, as shown on timing axes 202, 203 of the timing diagram 200.

For example, if the master device drives the logic level on the wired connection to be reduced from the default logic level for time $t_{D1}$ to request data from slave device Dev ID 1, slave device Dev ID 1 may in turn send an acknowledgment message to the master device by reducing the voltage on the wired connection for time $td_1$. It should be understood, however, that the present disclosure is not limited to the slave device sending the acknowledgement message in like manner. For instance, the slave devices may reduce or increase the voltage level on the wired connection for a set time period regardless of the time period (i.e., start-bit time interval) that the logic level was changed on the wired connection to address each slave device.

After the acknowledgement message is sent, slave device Dev ID 1 transmits data to the master device. In one or more embodiments, data sent over the wired connection may be one of two binary values (e.g., data bits) although the present disclosure is not limited thereto. In some implementations, to send a "0" data bit, the slave device drives the logic level to change from the default logic level for a time period less than a threshold time duration. Alternatively, to send a "1" data bit, each slave device drives the logic level to change from the default logic level for a time period that is greater than the threshold time duration.

For instance, in the example shown, to send a "0" data bit, slave devices may drives the logic level on the wired connection to be reduced from the default logic level for less than or equal to one microsecond. Alternatively, to send a "1" data bit, the slave devices may drives the voltage level on the wired connection to be reduced from the default logic level for greater than one microsecond. As shown on timing axis 203, four bits (0010) of data may be sent by slave device Dev ID 1.

In yet another example, the master device may address slave device Dev ID 2 by driving the logic level to change (e.g., reducing) from the default logic level for time $t_{d2}$. In response, slave device Dev ID 2 may send an acknowledgment message to the master device by reducing the voltage level from the default logic level for time $t_{ack}$ (see time axis 205) which may be equal to time $t_{d2}$ according to some embodiments of the present disclosure. Likewise, after slave device Dev ID 2 sends the acknowledgement message, $t_{ack}$, slave device Dev ID 2 may send data to the master device (e.g., 0011).

Figure 3:
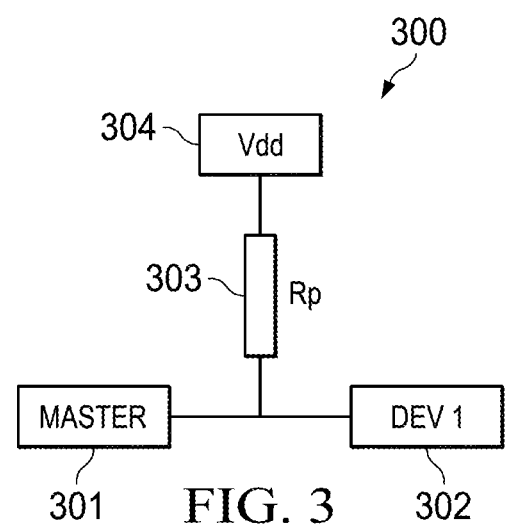
FIG. 3 is a diagram illustrating a system including a master device coupled to a slave device having a plurality of registers therein.

FIG. 3 is a diagram illustrating a system 300 including a master device 301 coupled to a slave device 302 having a plurality of registers (not shown) therein. In addition, a voltage source 303 and a resistive element 304 (e.g., pull-up or pull-down resistor) are coupled to the master and slave devices 301, 302 to effect communication between the devices. One having ordinary skill in the art may appreciate that system 300 may include a plurality of slave devices and therefore is not limited to a single slave device 302 as shown in the figure.

Figure 4:
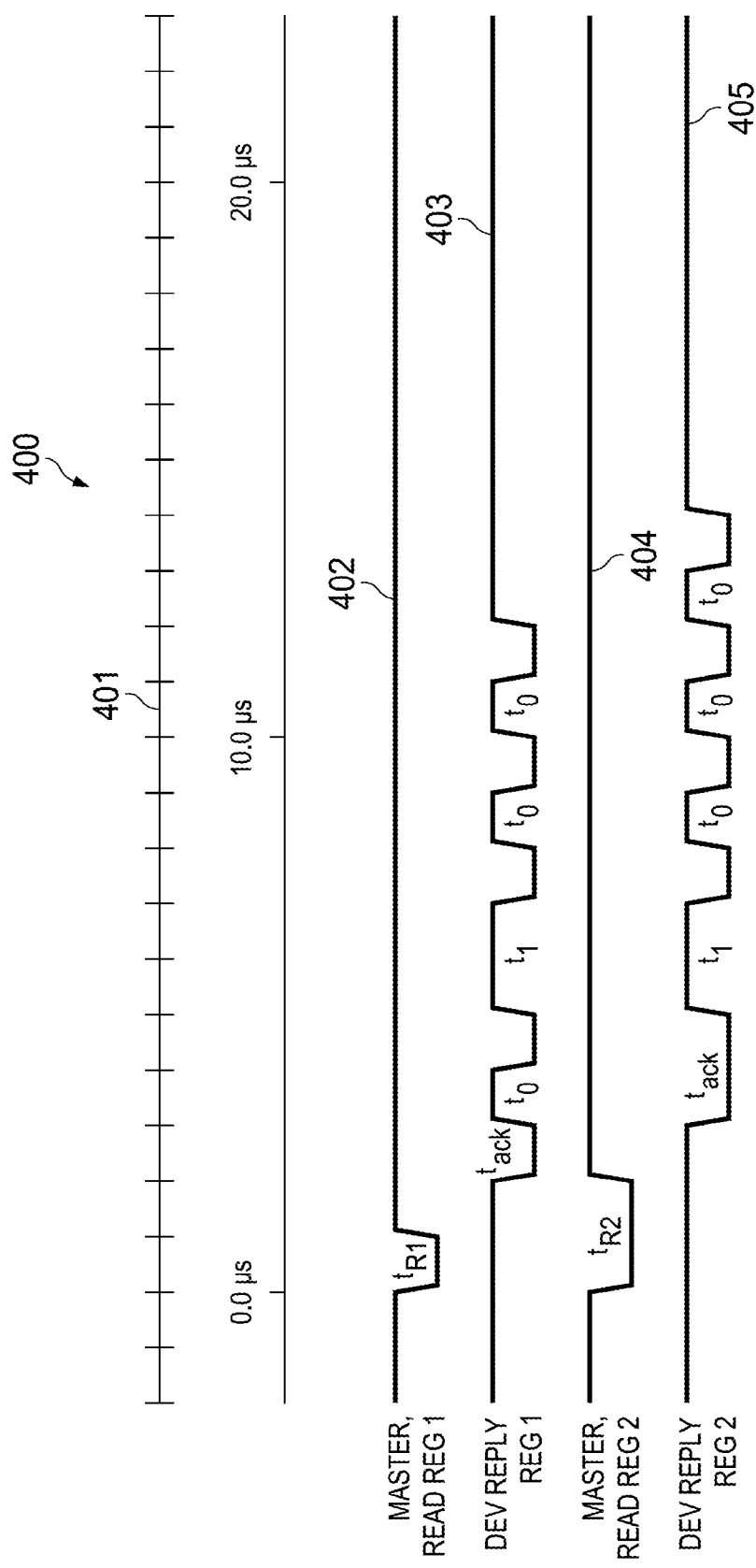
FIG. 4 is a timing diagram illustrating exemplary communication between a master device and a slave device having a plurality of registers therein.

FIG. 4 is a timing diagram 400 illustrating exemplary communication between a master device and a slave device having a plurality of registers therein. Timing axis 401 shows exemplary communication between the devices (on the order of microseconds). Advantageously, a master device may address a particular register within the slave device using the techniques described within this disclosure.

Master device may drive (e.g., reduce) the voltage on the wired connection to change from a default logic level for time $t_{r1}$, which lasts for approximately one microsecond (see timing axis 402). In this example, the master device may address Reg 1 within the slave device by driving the logic level on the wired connection to be reduced from the default logic level for time $t_{r1}$. Therefore, the slave device includes detection logic to enable the device to sense the voltage level on the wired connection at any given time to determine which register the master device is addressing.

Likewise, the slave device may send an acknowledgment message to the master device by driving the logic level to change from the default logic level for a time $t_{ack}$. In some embodiments, time $tr_1$ is equal to time $t_{ack}$. After sending the acknowledgment message, the slave device may send the data (e.g., data bits 0100) from the addressed register (e.g., Reg 1) to the master device.

Additionally, timing diagram 400 shows a second set of communications between a master device and a slave device to address a second register (e.g., Reg 2). The exemplary communication begins with the master device utilizing a transmitter to drive the logic level on the wired connection to be reduced from the default logic level for time $t_{r2}$ (e.g., two microseconds) to address Reg 2 of the slave device (see timing axis 404). In response, the slave device may send acknowledgement $t_{ack}$ to the master device and subsequently sends the register data (e.g., 1000) to the master device (see timing axis 405).

Figure 5:
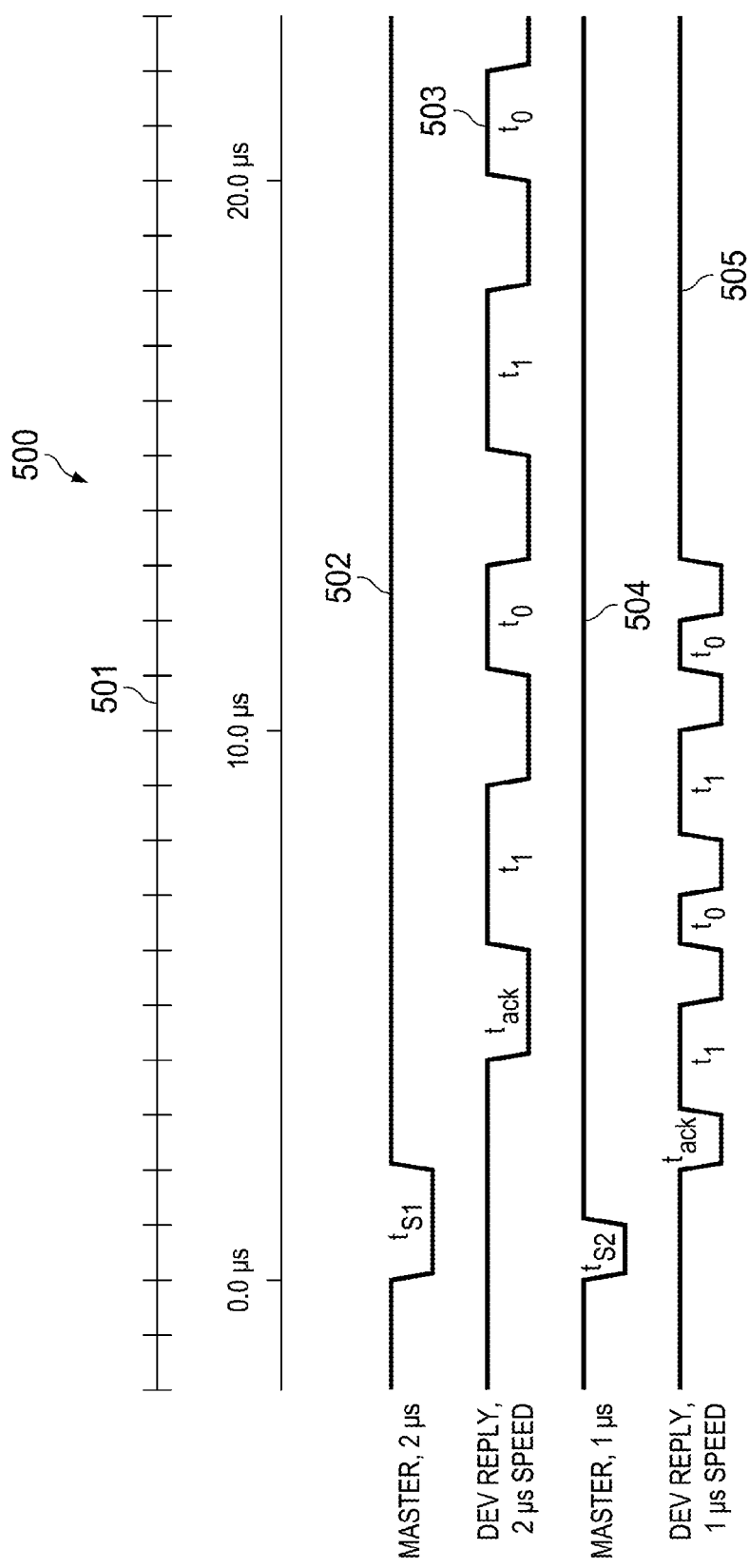
FIG. 5 is a timing diagram illustrating adaptive communication between a master device and a slave device.

FIG. 5 is a timing diagram 500 illustrating adaptive communication between a master device and a slave device. In particular, the present disclosure includes a mechanism for a master device to address a slave device at varying speeds. For example, a master device may drive the logic level on the wired connection to change from a default logic level for a time $t_{s1}$ to communicate to the slave device to send data. Likewise, upon sensing that the logic level has changed from the default logic level, the slave device may send an acknowledgment message $t_{ack}$ to communicate to the master device that the message was received and as a notice that the requested data will be sent. In the example shown in the figure, the slave device sends data bits 1010 to the master device.

Notably, time $t_{s1}$ extends for approximately two microseconds (see timing axis 502) and in turn time $t_{ack}$ extends for the same time (see timing axis 503). Therefore, the master device may elicit data from the slave device by driving the logic level on the wired connection to change for two microseconds.

In yet another example, the master device may drive the logic level on the wired connection to change from a default logic level for a time less than time $t_{s1}$. The master device may drive the logic level on the wired connection to change from a default logic level for time $t_{s2}$ (see timing axis 504) which in turn may be acknowledged by the slave device by sending an acknowledgement message. Subsequently, the slave device sends the data bits (1010) to the master device (see timing axis 505).

An adaptive start-bit time technique may be implemented with standard general-purpose input/output (GPIO) pins. Furthermore, an adaptive start-bit time technique may be implemented with GPIO pins even in the event that the GPIO pins are components of an I/O expander (e.g., Intel® Galileo with Quark SoC X 1000 using Cypress CY8C9540A I/O Expander).

Figure 6:
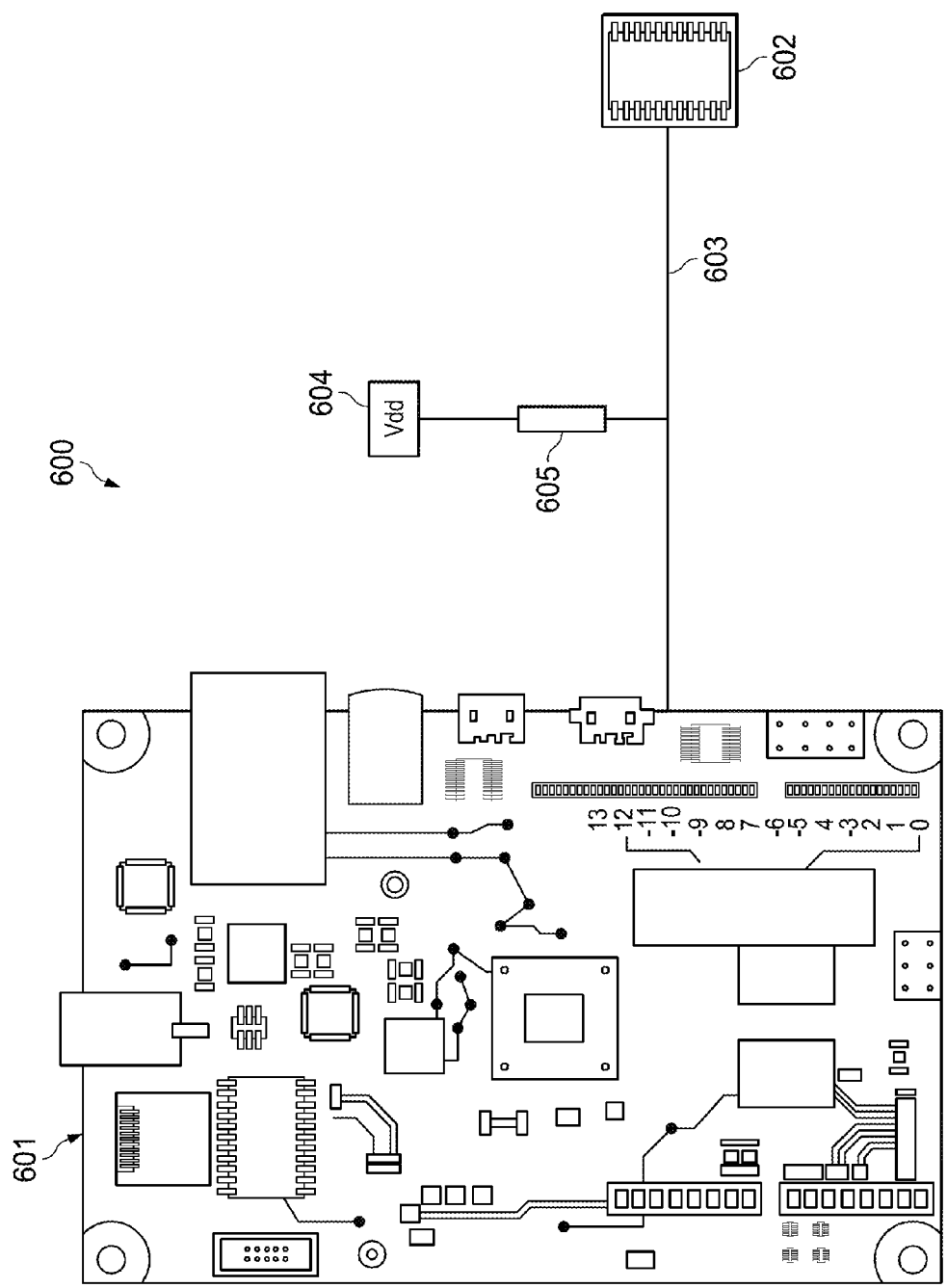
FIG. 6 is a diagram illustrating an exemplary master device coupled to a microcontroller.

FIG. 6 is a diagram illustrating an exemplary master device 600 coupled to a microcontroller device 602. Master device 600 may communicate with microcontroller device 602 by utilizing a (pull-up or pull-down) resistive element 605 to change the logic level on the wired connection 603 from the default logic level for a start-bit time interval.

Figure 7:
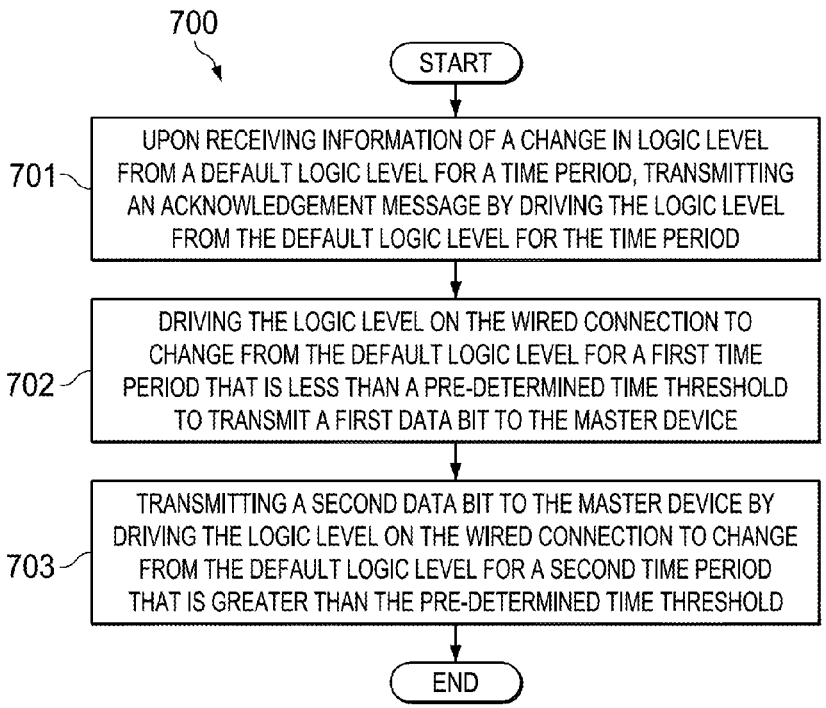
FIG. 7 is a flowchart of a method consistent with the present disclosure.

FIG. 7 is a flowchart 700 of a method for communicating between a master device and a slave device without utilizing a clock signal. Upon receiving information of a change in logic level from a default logic level for a time period, transmit an acknowledgment message by driving the logic level from the default logic level for the time period (block 701).

Next, a transmitter of the slave device drives the logic level on the wired connection to change from the default logic level for a first time period that is less than a predetermined time threshold to transmit a first data bit to the master device (block 702). Furthermore, the transmitter of the slave device may transmit a second data bit to the master device by driving the logic level on the wired connection to change from the default logic level for a second time period that is greater than a pre-determined threshold.

Figure 8:
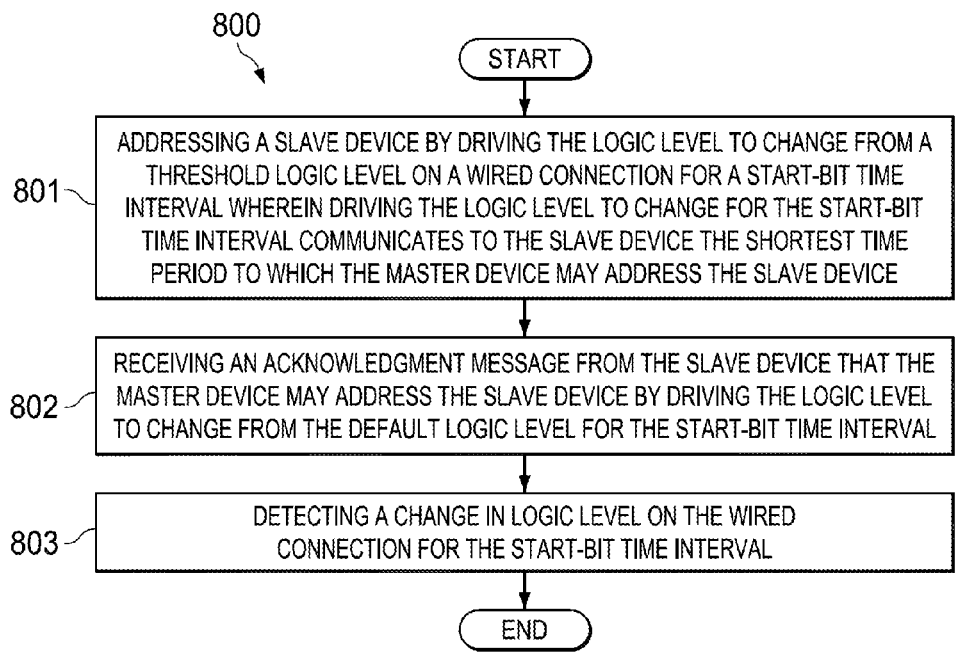
FIG. 8 is a flowchart of yet another method consistent with the present disclosure.

FIG. 8 is a flowchart 800 of a method for communicating between a master device and a slave device on a wired connection at various speeds without utilizing a clock signal. First, requesting data from a slave device by driving a change in logic level on the wired connection from a default logic level for a start-bit time interval (block 801) consistent with the configuration of the slave device. In particular, the time period (e.g., start-bit time interval) by which the logic level is below or above the default logic level communicates to the slave device the shortest time period in which the master device may address the slave device.

Next, receiving an acknowledgment message from the slave device. The slave device may send the acknowledgment message from the slave device by driving the logic level on the wired connection to change from the default logic level for start-bit time interval (block 802). Next, detecting a change in the logic level from the default logic level on the wired connection for the start-bit time interval (block 803).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus, comprising:
    control logic to determine whether information is to be sent to a first receiver device that is coupled with the apparatus via a single wire;
    a transmitter to drive a logic level on the single wire for a first pre-determined time period to address the first receiver device; and
    a non-clock timing component to determine when the first pre-determined time period has elapsed.

2. The apparatus of claim 1, wherein the apparatus is a master device.

3. The apparatus of claim 1, wherein to address the first receiver device includes requesting data from the first receiver device.

4. The apparatus of claim 1, wherein the transmitter is to address a second receiver device with a signal for a second pre-determined time period.

5. An apparatus, comprising:
    detection logic to sense a change in logic level from a default logic level for a time interval;
    a non-clock timing component to determine when a time period has elapsed; and
    a transmitter to send an acknowledgment message to a master device on a wired connection by causing the logic level to change, wherein the apparatus is coupled with the master device via the wired connection, and the wired connection includes a single wire.

6. The apparatus of claim 5, wherein the apparatus is a slave device.

7. The apparatus of claim 6, wherein the slave device includes a sensor.

8. The apparatus of claim 5 further comprising a plurality of GPIO pins to drive the logic level on the wired connection to change from the default logic level for the pre-determined time period.

9. The apparatus of claim 5, wherein a slave device includes a plurality of sensors wherein each sensor measures a unique property.

10. The apparatus of claim 5, wherein the change in logic level sensed by the detection logic exceeds a pre-determined voltage range.

11. The apparatus of claim 5, further comprising a counter to determine when a start-bit time interval has elapsed.

12. The apparatus of claim 5, wherein the transmitter is to send an acknowledgment message to the master device on the wired connection to drive the logic level on the wired connection to change from the default logic level.

13. A system, compromising;
    a master device;
    a plurality of slave devices coupled to the master device by a wired connection, wherein the wired connection includes a single wire between the master device and a slave device of the plurality of slave devices;
    wherein the master device includes a transmitter to address each of the plurality of slave devices on the wired connection by driving a logic level from a default logic level for a start-bit time interval according to a configuration of each slave device; and
    a non-clock timing component to determine when the start-bit time interval has elapsed.

14. The system of claim 13, wherein the system is configured in a multi-drop configuration.

15. The system of claim 13, wherein the default logic level is a positive voltage.

16. The system of claim 13, wherein the default logic level is a negative voltage.

17. The system of claim 13, wherein the start-bit time interval is on an order of milliseconds.

18. The system of claim 13, wherein the start-bit time interval is on an order of micro-seconds.

19. The system of claim 13, wherein the system is implemented within an Internet of Things environment.

20. The system of claim 13, further comprising a voltage source coupled to the wired connection.

21. The system of claim 20, further comprising a resistive element electrically coupled between the voltage source and each slave device.

* * * * *